July 26, 1960 A. BLAIN 2,946,976
PRINTED CIRCUIT BOARD WITH BIFURCATED TERMINALS
Filed Aug. 22, 1955
FIG. 1.
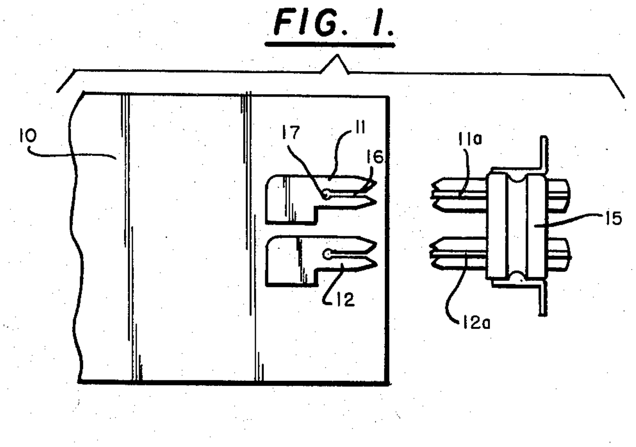
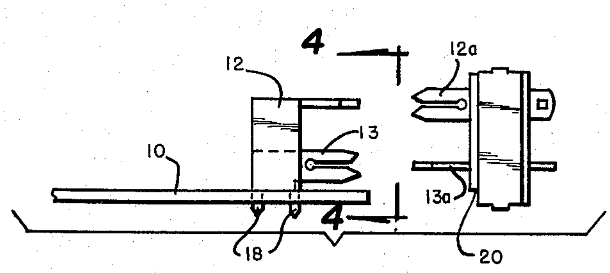
FIG. 2.
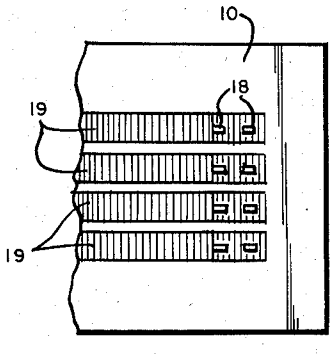
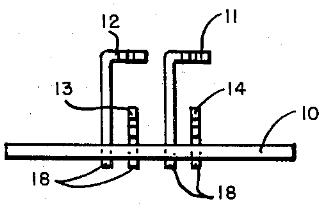
FIG. 4.
FIG. 3.
INVENTOR
ALBERT BLAIN
BY Charles C. English
AGENT

United States Patent Office 2,946,976

Patented July 26, 1960

2,946,976

PRINTED CIRCUIT BOARD WITH BIFURCATED TERMINALS

Albert Blain, Philadelphia, Pa., assignor to Sperry Rand Corporation, New York, N.Y., a corporation of Delaware Filed Aug. 22, 1955, Ser. No. 529,786

7 Claims. (Cl. 339—17)

This invention relates to terminals for printed circuit assemblies. As is well known, the printed circuit technique has found great favor due to its low cost but one of the difficulties thereof resides in providing means for attaching the ends of the printed conductors to terminals so that other elements may be connected to and disconnected from the printed circuit assembly. The primary object of this invention is to provide a novel terminal structure which is more compact and which accordingly permits printed circuit assemblies to be made which are smaller.

Another object of the invention is to provide a printed circuit terminal which permits the printed conductors to be placed on closer spacings.

Another object of the invention is to provide a terminal for printed circuits which will feed current from those circuits to associated circuits outside the printed circuit assembly.

Another object of the invention is to provide a terminal for printed circuits which has pluggable means associated therewith whereby another circuit may be plugged into or removed from conductive relation with the printed circuit.

Another object of the invention is to provide a terminal for a printed circuit whereby a conventional plug may be used to connect an external circuit to the printed circuit.

Other objects and advantages of the invention will appear as this description proceeds.

The invention, described briefly, employs two types of strips which are staked to an insulating base plate. A first type of strip is L-shaped, the shorter leg of which lies parallel to the base plate. The long leg is staked in a cantilever manner from the base plate. The short legs overlie additional strips which are staked to the base plate. The additional shorter strips are straight. The strips respectively carry conventional electrical terminals so arranged that a conventional plug may be inserted into the same or removed therefrom. The printed circuit connects to the terminal strips on the underside of the insulating base plate.

In the drawings:

Figure 1 is a top view of the new arrangement.

Figure 2 is a side view of the device of Figure 1.

Figure 3 is a bottom view of the device of Figure 1.

Figure 4 is a view taken along line 4—4 of Figure 2.

In a typical embodiment, an insulating base plate 10, composed of fiber, Bakelite or other suitable material, carries two L-shaped terminals 11 and 12. The lower ends (Figure 2) of the longer limbs of the L pass through the base plate 10 and are staked thereto at 18. Two strips 13 and 14 have their longer edges parallel to the base plate 10. The forward halves of these two strips are slitted to thus form conventional terminal arrangements, whereas the rear halves of these two strips each have two stakes 18 which pass through the base plate 10 and rigidly support the members 13 and 14. It is noted that strips 13 and 14 lie under the shorter limbs of the L-shaped members 11 and 12. As shown in Figure 1, the shorter limbs 11 and 12 include slits such as slit 16 which is enlarged at its rear end 17. The slitted portions of members 11 and 12 form conventional terminals. The slit 16 is parallel to and immediately above the upper edge of strip 14. A similar relation exists between the slit in strip 12 and strip 13. As shown in Figure 3, four printed circuits 19 respectively connect to the stakes which form parts of strips 11, 12, 13 and 14 whereby the four printed circuits are respectively connected to the four terminals. A plug 15 of known type may be used to connect external circuits to, or disconnect external circuits from, the four printed circuits respectively. Plug 15 has four slitted strips which respectively cooperate with slitted strips 11, 12, 13 and 14. Two of these strips, 11*a* and 12*a*, are shown in Figure 1, and a third one of these strips 13*a* appears in Figure 2. The projecting portions of these slitted strips are identical with the projecting portions of strips 11 and 12 and cooperate therewith in the usual way. When the plug 15 is forced into the terminals 11, 12, 13 and 14, the upper right hand corner of the base plate 10, as viewed in Figure 2, fits into the indent 20 of the plug 15 and thus effects a rigid mounting for the plug 15. The L-shaped arrangement of strips 11 and 12 overlying the strips 13 and 14 which are mounted on their edges, forms a very simple and effective arrangement for connecting printed circuits to an ontput terminal and constitutes an important aspect of this invention.

It can be seen that a large plurality of strips 12 and 13 can be arranged and attached to a printed circuit board connected to and corresponding to a large plurality of circuit lines 19. Plug structures 15 carrying cooperating contacts 12*a* and 13*a* serve both to connect to the printed circuit and can also provide physical support and mounting for the printed circuit assembly.

Having thus described the invention, what is claimed is:

1. In an electrical contacting device, the combination of a base structure having first and second printed circuits thereon, a first set of connectors comprising a first terminal substantially L-shaped in configuration, said first terminal comprising a planar supporting leg fabricated of conducting material attached to said base in electrical contact with said first circuit and extending from said base structure in a plane substantially perpendicular to said base, and a planar contacting portion extending from said supporting leg and in spaced relation to said base in a plane substantially parallel to said base, a second terminal being substantially L-shaped in configuration, said second terminal comprising a planar supporting leg fabricated of conducting material attached to said base in electrical contact with said second circuit and extending from said base structure in a plane substantially parallel to that of said supporting leg of said first terminal, a planar contacting portion coplanar with said supporting leg and extending from said supporting leg in spaced relation to said base in a plane substantially perpendicular to said base, said second terminal being positioned between said base structure and said planar contacting portion of said first terminal so that the extended plane of said second terminal intersects said contacting portion of said first terminal, a second insulating support member, and a second set of connectors comprising third and fourth terminals having contacting portions extending from said second insulating support member in planes respectively at right angles to the planar contacting portions of said first and second terminals, the contacting portion of at least one terminal of each set being bifurcated in configuration so that said first set and said second may be interengaged.

2. In an electrical contacting device, the combination of a base structure having first and second printed circuits thereon, a first terminal attached to said base in electrical contact with said first circuit, said first terminal being substantially L-shaped in configuration having a planar supporting leg fabricated of conducting material extending from said base structure in a plane substantially perpendicular to said base and a planar contacting portion extending from said supporting leg in spaced relation to said base in a plane substantially parallel to said base, said planar contacting portion having a bifurcated configuration, a second terminal attached to said base in electrical contact with said second circuit, said second terminal being substantially L-shaped in configuration comprising a planar supporting leg fabricated of conducting material extending from said base structure in a plane substantially parallel to that of said supporting leg of said first terminal and a planar contacting portion coplanar with said supporting leg and extending from said supporting leg in spaced relation to said base in a plane substantially perpendicular to said base, said contacting portion of said second terminal being bifurcated in configuration, said second terminal being positioned between said base structure and said planar contacting portion of said first terminal so that the extended plane of said second terminal intersects said contacting portion of said first terminal.

3. Interconnecting terminal means comprising a printed circuit base of insulating material, a first strip of metal the faces of which are perpendicular to said base with one of the lateral edges of said first strip lying on the surface of one face of said base, means comprising a conducting portion of said first strip extending through said base for attaching said first strip near one end thereof to a printed circuit mounted on the opposite side of said base, a second strip of metal having one lateral edge thereof lying on said base and parallel to one lateral edge of said one end of said first strip, means comprising a conducting portion of said second strip extending through said base for attaching said second strip to a further printed circuit mounted on the opposite side of said base, said second strip having a contacting portion extending substantially parallel to and spaced from said base in a plane substantially at right angles to said base, said first strip having a contacting portion overlying the contacting portion of said second strip and extending substantially parallel to said base in a plane substantially parallel to and spaced from said base, the contacting portions of said first and second strips being bifurcated in configuration.

4. Interconnecting means comprising a first base composed of insulating material, a first elongated conducting element attached at one end thereof to said first base and having a first bifurcated contacting portion at the other end thereof, a second elongated conducting element attached at one end thereof to said first base in spaced relation to said first conducting element and having a second bifurcated contacting portion at the other end thereof, said first and second contacting portions each being planar in configuration, said first and second contacting portions being disposed in superposed relation to one another and extending in directions substantially parallel to said first base with the planes of said first and second contacting portions being at substantially right angles to one another, two printed circuits on said first base in electrical contact with conductive mounting stakes extending from said one end of said first and second elongated conducting elements respectively, a second insulating base, third and fourth elongated conducting elements extending through said second base, said third and fourth conducting elements having a bifurcated planar contacting portion at one end, the planes of said contacting portions of said third and fourth conducting elements being respectively perpendicular to the planes of the contacting portions of the said first and second conducting elements and a portion of said first base being arranged to engage a portion of said second base when said contacting portions are in contact.

5. A terminal comprising a base composed of an insulating material, a first conductive element anchored to said base having a first contacting portion extending therefrom, said first contacting portion being located in a plane substantially perpendicular to said base, a second conductive element anchored to said base having a second contacting portion positioned further from said base than said first contacting portion, said second contacting portion being located in a plane substantially parallel to said base, each of said first and second conductive elements being substantially L-shaped in configuration, each of said first and second contacting portions being bifurcated in configuration, said first and second conductive elements including conductive portions extending through said base, a pair of printed circuits on the side of said base opposite said contacting portions and respectively in electrical contact with said conductive portions of said conductive elements.

6. A terminal for printed circuits comprising a base having printed circuits thereon, first and second conductive elements attached to a common side of said base in contact with said printed circuits respectively, said first conductive element extending further from said base than said second conductive element and having a first planar contact portion extending in a plane substantially parallel to said base, said second conductive element having a second contact portion disposed between said base and said first contact portion extending in a plane substantially perpendicular to said base, each of said first and second contact portions being bifurcated in configuration.

7. An electrical coupling device for printed circuits comprising a base, pluralities of first and second terminals having conductor elements attached to said base in alternating disposition to one another, each of said first and second terminals having bifurcated contact portions, said contact portions of said first terminals being spaced further from said base than the contact portions of said second terminals, said contact portions of said first and second terminals being in planes which are mutually perpendicular, said contact portions of said second terminals being disposed between said base and said contact portions of said first terminals, a plurality of printed circuits on said base, each of said first and second terminals having a conducting portion in electrical contact with one of said printed circuits respectively.

References Cited in the file of this patent

UNITED STATES PATENTS

| | | |
|---|---|---|
| Re. 23,547 | Fox | Sept. 9, 1952 |
| 1,964,541 | Soreny | June 26, 1934 |
| 2,440,270 | Hecht | Apr. 27, 1948 |
| 2,474,988 | Sargrove | July 5, 1949 |
| 2,613,244 | Del Camp | Oct. 7, 1952 |
| 2,750,572 | Fox | June 12, 1956 |
| 2,752,580 | Shewmaker | June 26, 1956 |
| 2,832,013 | Pedersen et al. | Apr. 22, 1958 |